United States Patent [19]
Parker et al.

[11] 3,873,537
[45] Mar. 25, 1975

[54] 1-IMIDOCARBONYL-2-(1H)-PYRIDONES AND METHOD OF PREPARING SAME

[75] Inventors: William Lawrence Parker, North Brunswick; Saul Lewis Neidleman, Trenton, both of N.J.

[73] Assignee: E. R. Squibb & Sons, Inc., New York, N.Y.

[22] Filed: May 28, 1971

[21] Appl. No.: 148,208

[52] U.S. Cl....... 260/247.2 A, 260/242, 260/270 R, 260/287 R, 260/293.69, 260/294.8 G, 260/296 R, 424/59
[51] Int. Cl............................................. C07d 87/42
[58] Field of Search.. 260/247.2 A, 294.8 G, 297 Z, 260/270 R, 293.69, 287 R, 296 R, 242

[56] References Cited
UNITED STATES PATENTS

| | | | |
|---|---|---|---|
| 2,104,492 | 1/1938 | Merkel et al. | 167/90 |
| 2,257,106 | 9/1941 | Christiansen | 167/58 |
| 2,267,200 | 12/1941 | Hersberger et al. | 167/90 |
| 2,274,725 | 3/1942 | Meeker et al. | 167/90 |
| 2,276,204 | 3/1942 | Kilgore | 88/114 |
| 2,719,162 | 9/1955 | Sawdey et al. | 260/306.7 |
| 2,888,346 | 5/1959 | Tulagin et al. | 96/84 |
| 2,921,078 | 1/1960 | Boehme | 260/297 |

*Primary Examiner*—Donald G. Daus
*Assistant Examiner*—Jose Tovar
*Attorney, Agent, or Firm*—Lawrence S. Levinson; Merle J. Smith; Burton Rodney

[57] ABSTRACT

In addition to cyanation of the nucleophile, the reaction of 2-oxo-1(2H)-pryidinecarbonitrile and derivatives thereof with a nucleophile of formula QM from which an anion may be generated results in addition of the nucleophile to the carbonitrile function to form an imidocarbonyl derivative of the formula

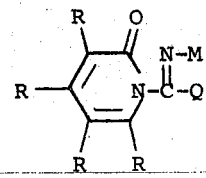

wherein each R may be the same or different and may be hydrogen, lower alkyl or lower alkenyl of up to 12 carbon atoms, hydroxyl, lower alkoxy of up to 12 carbon atoms, nitro, cyano, halogen, carboxy, amido, mercapto, aliphatic or aromatic acyl radicals of up to 20 carbon atoms, a phenyl radical substituted by one of the foregoing substituents, phenyl or aryloxy of up to 10 carbon atoms, Q may be alkyl, alkoxy, thioalkyl, aryl, aryloxy, arylthio, amino, monoalkylamino, dialkylamino, monoarylamino, diarylamino, or a basic nitrogen containing heterocyclic radical attached to C through the nitrogen atom, and M may be H, alkali metal, alkaline earth metal, Tl, divalent Cd, MgBr, MgQ or CaQ. The imidocarbonyl compounds absorb ultraviolet light and are useful as sun screen agents.

3 Claims, No Drawings

1-IMIDOCARBONYL-2-(1H)-PYRIDONES AND METHOD OF PREPARING SAME

OBJECTS OF THE INVENTION

It is an object of the present invention to provide new compounds which absorb ultraviolet light and which are useful as sun screen agents. Another object is to provide a method for the preparation of these compounds. These and other objects of the present invention will be apparent from the following description.

BACKGROUND OF THE INVENTION

As shown in the following reaction sequence, 2-oxo-1-(2H)-pyridinecarbonitrile and derivatives thereof (II) may be prepared by reacting an acetoacetamidopyridine compound of formula I with a nitrite salt at an acidic pH. The nitrite salt may be a water-soluble alkali metal nitrite, e.g., $LiNO_2$, $NaNO_2$, $KNO_2$; or a water-soluble alkaline earth metal nitrite, e.g., $Ca(NO_2)_2$. The reaction takes place in aqueous medium at lowered temperatures, preferably at temperatures below about 10°C, and most preferably at about 0°C. The compound of formula II is extracted from the aqueous medium by means of a water-immiscible organic solvent, such as an ester, e.g., ethyl acetate; an ether, e.g., ethyl ether; a halogenated alkane, e.g., chloroform; or an aromatic solvent, e.g., benzene, toluene or xylene.

The compound of formula II may also be prepared by reacting an alkali metal salt of a 2-pyridone compound of formula III with a cyanogen halide. This reaction takes place in a polar solvent at lowered temperatures. Suitable solvents are amides, e.g., dimethylformamide or dimethylacetamide; or ethers, e.g., bis(2-methoxyethyl)-ether. Suitable temperatures are from about −10°C to about 10°C, preferably at about 0°C.

The alkali metal salt of the 2-pyridone compound of formula III may be obtained by reacting a compound of formula III with an alkali metal hydroxide, e.g., LiOH, NaOH or KOH; an alkali metal hydride, e.g., LiH, NaH or KH; an alkali metal amide, e.g., $LiNH_2$, $NaNH_2$, or $KNH_2$; or an alkyl organo-alkali metal compound, e.g., Li-butyl, Na-butyl or K-butyl.

The cyanogen halide employed to convert the alkali metal salt of the compound of formula III to the corresponding compound of formula II is preferably cyanogen bromide or cyanogen chloride.

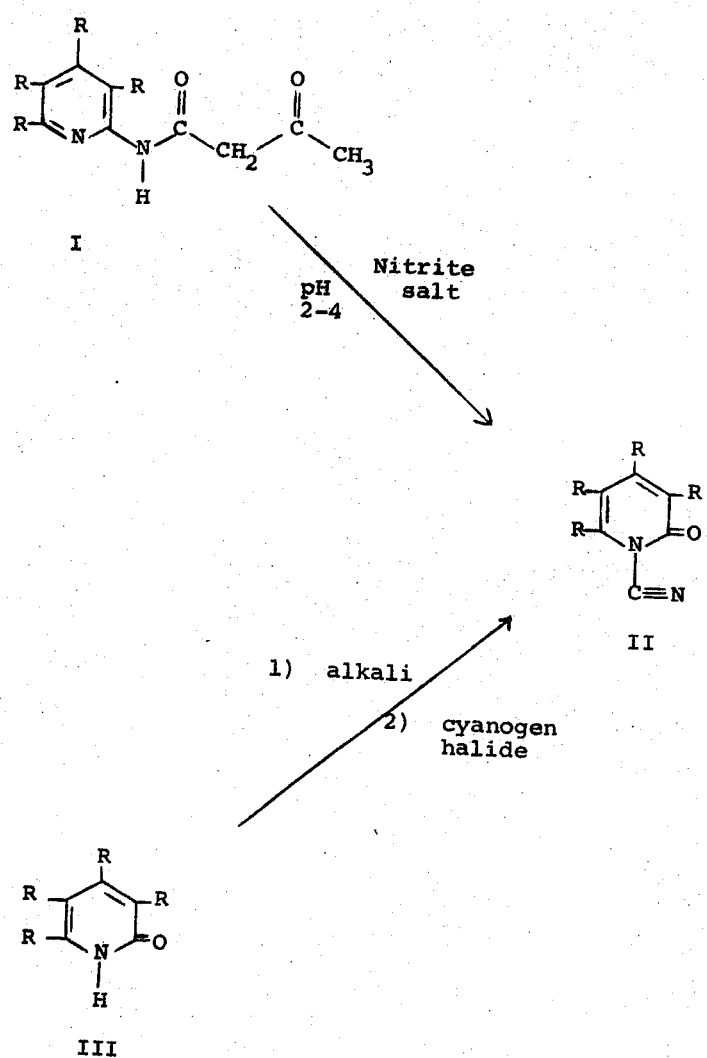

DETAILED DESCRIPTION

It has now been found that the reaction of a 2-oxo-1(2H)-pyridinecarbonitrile compound of formula II with a nucleophilic compound produces an imidocarbonyl compound in addition to cyanating the nucleophile. The imidocarbonyl compound is formed by addition of the nucleophile to the carbonitrile function.

The reaction between the compound of formula II and the nucleophilic compound may be illustrated by the following equation:

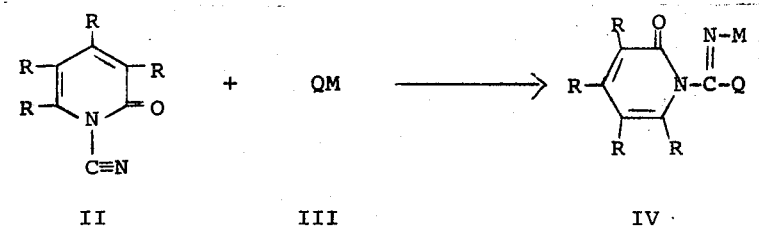

The reaction between the compound of formula II and the nucleophile of formula QM takes place in the presence of easily volatilized inert solvents, that is, solvents which have a boiling point not over about 100°C at atmospheric pressure. The choice of solvents depends essentially upon the solubilities of the reactants. The reaction may take place at temperatures in the range of about 0°C to about the boiling point of the solvent. Examples of suitable solvents are ethers, e.g., ethyl ether or dioxane, aromatic solvents, e.g., benzene, toluene or xylene, aliphatic solvents, e.g., hexane or heptane, halogenated solvents, e.g., chloroform or methylene chloride, and ketones, e.g., acetone or methyl ethyl ketone.

The reaction mixture is stirred for several minutes to an hour or more, typically for from about 30 minutes to about 2 hours. The solvent is then removed under reduced pressure and the residue purified by thin-layer chromatography on silica gel. A uv absorbing band is collected and washed from the silica gel. Removal of the wash liquor gives the desired product of formula IV.

The nucleophilic compound QM of formula III may be any compound from which an anion may be generated, usually by means of a strong base. As typical nucleophilic compounds there may be mentioned alcohols, thiols, amines, ammonia, phenols, thiophenols, Grignard reagents and malonic esters. Thus, the nucleophilic compound may have the formula QM wherein Q may be alkyl, alkoxy, thioalkyl, aryl, aryloxy, arylthio, amino, monoalkylamino, dialkylamino, monoarylamino, diarylamino, or a basic nitrogen containing heterocyclic radical attached to M through the nitrogen atom, and wherein M may be H, alkali metal, MgBr, Tl, MgQ or CaQ. Reaction of a compound of formula II with a nucleophile of formula QM forms an imidocarbonyl compound of formula IV.

Specific examples of such nucleophiles are the following:

I. Alcohols containing from 1 to 20 carbon atoms
   A. Primary alcohols such as alkanols, cycloalkanols, and aryl-substituted alkanols, e.g., methanol, ethanol, n-propanol, n-butanol, n-pentanol, n-hexanol, n-heptanol, n-octanol, n-nonanol, n-decanol, n-dodecanol, n-tetradecanol, n-hexadecanol, n-octadecanol, 2-methyl-1-propanol, isoamylalcohol, 2-methyl-1-butanol, benzyl alcohol, cyclohexylcarbinol, ethylene glycol and trimethylene glycol.
   B. Secondary alcohols, such as alkanols, cycloalkanols and aryl-substituted alkanols, e.g., 2-propanol, 2-methyl-2-propanol, 3-methyl-2-butanol, 2-pentanol, 3-pentanol, 3-hexanol, benzhydrol, cyclohexanol and dicyclohexylcarbinol.
   C. Tertiary alcohols, such as alkanols, cycloalkanols and aryl-substituted alkanols, e.g., t-butanol, t-amyl alcohol, 2,3-dimethyl-2-butanol, triphenylcarbinol and tricyclohexylcarbinol.
   D. Mixed alcohols having primary and secondary alcohol groups, e.g., propylene glycol, glycerol, β-methylglycerol, glucose, fructose, apiose, mannose, mannitol, galactose and acrose.

II. Thiols containing from 1 to 20 carbon atoms corresponding to the foregoing alcohols. The thiols, or mercaptans, are prepared conveniently by heating alkyl halides with sodium hydrosulfide.

III. Ammonia and organic amines containing from 1 to 20 carbon atoms, and alkali and alkaline earth metal derivatives thereof.
   A. Primary alkylamines, cycloalkylamines, arylsubstituted alkylamines, and aromatic amines, e.g., methylamine, ethylamine, n-propylamine, isopropylamine, n-butylamine, isobutylamine, t-butylamine, n-amylamine, n-hexylamine, n-octylamine, 2-aminooctane, 2-ethyl-1-aminohexane, n-decylamine, laurylamine, cyclohexylamine, benzylamine, α-phenylethylamine, β-phenylethylamine, aniline and α-aminopyridine.
   B. Secondary amines such as dialkylamines, arylsubstituted alkylamines, dicyclohexylamines and diarylamines, and N-heterocyclic amines, e.g., dimethylamine, diethylamine, di-n-propylamine, diisopropylamine, ethyl-sec-butylamine, diphenylamine, benzylaniline, N-methylaniline, N-ethylaniline, N-phenylbenzylamine, N-methylbenzylamine, diphenylamine, dicyclohexylamine, morpholine, piperidine, pyrrolidine, pyrrole, pyrrolidine, pyrazole, imidazole, benzopyrrole, skatole, 2-methylindole, 2-phenylindole, 1,2,3,4-tetrahydroquinoline, decahydroquinoline and carbazole.

IV. Phenols such as phenol and substituted phenols containing from 6 to 12 carbon atoms, such as o-cresol, m-cresol, p-cresol, o-chlorophenol, m-chlorophenol, p-chlorophenol, p-bromophenol, 2,4,6-trichlorophenol, 2,4,6-trifluorophenol, o-nitrophenol, m-nitrophenol, p-nitrophenol, 2,4-dinitrophenol, guaiacol, saligenin, carvacrol, thymol, o-hydroxydiphenyl, p-hydroxydiphenyl, o-cyclohexylphenol, p-cyclohexylphenol, catechol, resorcinol, hydroquinone, pyrogallol and phloroglucinol.

V. Thiophenols include thiophenol and substituted thiophenols containing from 6 to 12 carbon atoms corresponding to the foregoing phenols.

VI. Grignard reagents of the formula RMgX wherein R is an organic radical which forms a Grignard reagent and X is halogen, e.g., R may be alkyl, cycloalkyl, aryl, substituted alkyl, substituted cycloalkyl or substituted aryl.

VII. Malonic esters, e.g., $Na^+[CH(COOC_2H_5)_2]^-$.

VIII. Organometallic compounds wherein the organic radical may be alkyl or aryl and the metal may be an alkali metal or an alkaline earth metal or divalent Cd, e.g., butyl Li, phenyl Li, ethyl Na, amyl Na, octyl Na, diphenyl Mg, diethyl Mg, diethyl Ca, and dioctyl Cd.

The following examples illustrate the invention without, however, limiting the same thereto. Unless otherwise indicated, all temperatures are expressed in degrees centigrade.

EXAMPLE 1

1-(Morpholinoimidocarbonyl)-2-(1H)-pyridone

Morpholine, 0.202 ml, is added to a stirred solution of 280 mg of 2-oxo-1-(2H)-pyridinecarbonitrile in 30 ml of ether and the solution is stirred at room temperature under atmospheric pressure for one hour. The solvent is then removed at reduced pressure and the residue is purified by preparative thin-layer chromatography on silica gel, using ethanol as the developing solvent. A uv absorbing band, having an $R_f$ of 0.16 to 0.61 is collected and washed from the silica gel with methanol. The solvent is removed in vacuo giving 82 mg of crystalline solid that, after several recrystallizations from ethyl acetate, melts at 117°–118°. The nmr and ir spectra indicate that the product has the following structure:

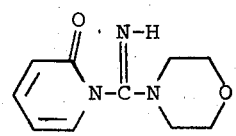

Anal. calcd for $C_{10}H_{13}N_3O_2$: C, 57.96; H, 6.32; N, 20.28. Found: C, 57.83; H, 6.29; N, 20.23.

EXAMPLES 2–17

Following the procedure of Example 1 but substituting for morpholine an equivalent amount of the nucleophile indicated in Column I, there is obtained the compound of Column II.

| Example | Column I | Column II |
|---|---|---|
| 2 | piperidine | 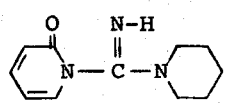 |
| 3 | pyrrolidine | 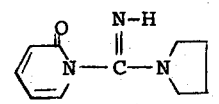 |
| 4 | thiophenol | 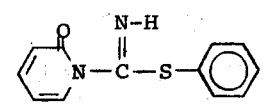 |
| 5 | sodium phenoxide | 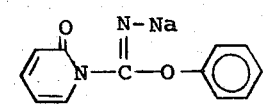 |
| 6 | aniline | 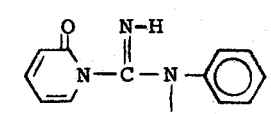 |
| 7 | n-pentylamine | 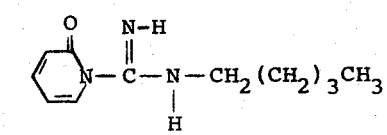 |
| 8 | phenyl magnesium bromide | 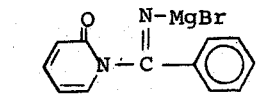 |

| Example | Column I | Column II |
|---|---|---|
| 9 | sodium thiophenolate | 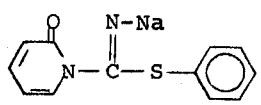 |
| 10 | n-butylmercaptan | 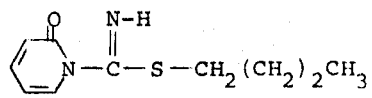 |
| 11 | diethylamine | 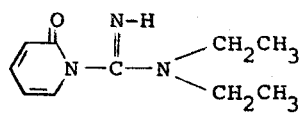 |
| 12 | diphenylamine | 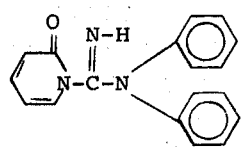 |
| 13 | sodium ethoxide | 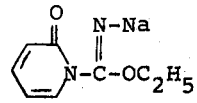 |
| 14 | sodium dielhylmalonate | 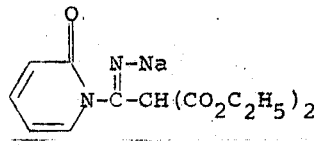 |
| 15 | $Mg(C_2H_5)_2$ | 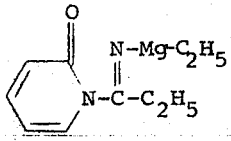 |
| 16 | $Ca(C_2H_5)_2$ | 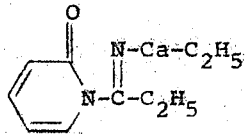 |
| 17 | $TlOC_2H_5$ | 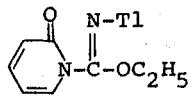 |
| 18 | $Cd(C_8H_{17})_2$ | 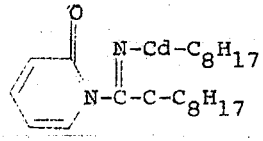 |
| 19 | ⌬—Li | 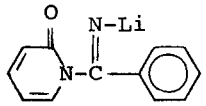 |
| 20 | $C_5H_9Na$ | 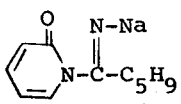 |

| Example | Column I | Column II |
|---|---|---|
| 21 | Mg(C$_6$H$_5$)$_2$ | 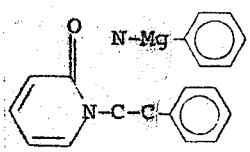 |
| 22 | NaNH$_2$ | 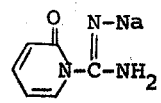 |

EXAMPLES 23–24

Treatment of the product of Examples 5, 8, 9 and 14–22 with one equivalent of hydrochloric acid results in replacing with hydrogen the Na of Examples 5, 9, 14, 20 and 22, the MgBr of Example 8, the Mg of Examples 15 and 21, the Ca of Example 16, the Tl of Example 17, the Cd of Example 18, and the Li of Example 19.

We claim:
1. A compound of the formula

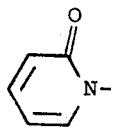

wherein Q is alkyl, alkoxy, alkylthio, mono- or dicyclic carbocyclic aryl, mono- or dicyclic carbocyclic aryloxy, mono- or dicyclic carbocyclic arylthio, amino, monoalkylamino, dialkylamino, mono(mono- or dicyclic carbocyclic aryl)amino, di(mono or dicyclic carbocyclic aryl)amino, morpholino, piperidino, pyrrolidino, pyrrolino, pyrazolino, imidazolino, benzopyrrolidino, skatolino, 2-methylindolino, 2-phenylindolino, 1,2,3,4-tetrahydroquinolino, decahydroquinolino or carbazolino; and M is hydrogen, alkali metal, alkaline earth metal, Tl, CdQ, MgBr, MgQ or CaQ, with the proviso that together QM is a nucleophilic compound.

2. A compound according to claim 1 having the name 1-(morpholinoimidocarbonyl)-2-(1H)-pyridone.

3. A method for preparing a compound according to claim 1 which comprises the step of reacting a compound of the formula

with a nucleophilic compound of the formula QM, wherein Q and M are as defined in claim 6.

* * * * *